United States Patent [19]
Strand

[11] 3,869,400
[45] Mar. 4, 1975

[54] PROCESS FOR PRODUCING AN AQUEOUS REACTION PRODUCT SLURRY OF A DIAMINE AND A DIACID

[75] Inventor: Albert Thomas Strand, Newark, Del.

[73] Assignee: E. I. du Pont de Nemours and Company, Wilmington, Del.

[22] Filed: Oct. 17, 1972

[21] Appl. No.: 298,304

[52] U.S. Cl.............................. 252/182, 260/78 R
[51] Int. Cl............................................... C09k 3/00
[58] Field of Search............. 252/182, 8.8; 8/178 R; 260/78 R

[56] References Cited
UNITED STATES PATENTS
3,502,624   3/1970   Flack et al...................... 252/182 X Primary Examiner—Stephen J. Lechert, Jr.

[57] ABSTRACT

The present invention relates to a method for preparing a stable, pumpable slurry of a polyamide salt for use in a polymerization process.

3 Claims, 2 Drawing Figures

PATENTED MAR 4 1975 3,869,400

3,869,400

PROCESS FOR PRODUCING AN AQUEOUS REACTION PRODUCT SLURRY OF A DIAMINE AND A DIACID

BACKGROUND OF THE INVENTION

1. Field of the Invention

This invention is related to the preparation of polyamides. It relates to an improved processing step whereby commercial production of certain polyamides is facilitated.

2. Description of the Prior Art

It is well known in the art of making polyamides by reaction of diamines and dicarboxylic acids to first form the salt from the two reactants, using an amount of each selected to give the desired polymer properties. For example, exactly equivalent amounts of each reactant are usually employed if the highest possible molecular weight is desired, while an excess of diamine or an excess of diacid may be used to promote acid or basic dyeability, respectively, or to control molecular weight. Excess diamine is often added to compensate for losses during polymerization.

A solution of the polyamide salt may be charged to an autoclave, and the whole polymerized; this procedure is especially useful when the salt is soluble in a low-cost solvent, e.g., water. Alternatively, the salt may be precipitated from the solvent in which it was made, and dried for subsequent use. The dry salt may then be charged to an autoclave, and, according to the teachings of U.S. Pat. No. 2,163,636, a small amount of water may be added before polymerizing.

When the polyamide salt is not soluble in water, the salt may be prepared in an organic solvent such as methanol, as disclosed, for example, in U.S. Pat. No. 3,393,210. In some cases the salt may have a unique solubility relationship such that it becomes water soluble above 100°C., as disclosed in U.S. Pat. No. 3,502,624. This characteristic permits the use of water as a solvent, but it has the disadvantage that some polymerization may occur at the elevated temperature during long-term storage, producing polymer which may plug process lines. These difficulties can be avoided through use of the present invention.

SUMMARY OF THE INVENTION

This invention is directed to a process for preparing a stable, pumpable slurry of a polyamide salt having a low solubility in water at ambient temperatures. The stable, pumpable aqueous slurry can be held for long periods of time at 25°-60°C. The slurry consists essentially of 10 to 35 percent (all percentages are by weight) of the salt which is the reaction product of essentially equivalent amounts of diamine and diacid, the diamine being at least 75 mol percent bis(4-aminocyclohexyl)-methane (PACM) and the diacid being at least 75 mol percent 1,12 dodecanedioic acid (12 acid), wherein the salt is present as platelet crystals having an average length ranging from 5 to 15 microns and an average width ranging from 1 to 5 microns. Such a slurry has a viscosity at 55°C. of 10 to 100 centipoises measured at a shear rate of 470 sec.$^{-1}$ in a pipe line.

By "essentially equivalent amounts of diamine and diacid" is meant that the pH of the system will be between 6.7 to 10.0 which includes the pH of the exact equivalence point for PACM-12 salt.

The pumpable slurry composition is produced by a process comprising the steps:

a. Producing a water solution of a polyamide salt (i.e., contains at least 75 mol percent each of PACM and –12 units) which is at least 75 mol percent PACM-12 at a temperature about 100°C., preferably at about 130°C., and at autogenous or greater pressure, the salt solution having a concentration of 50 to 70 percent as taught by Flack and Weir in U.S. Pat. No. 3,502,624;

b. Adding the salt solution to sufficient water at about 20° to 50°C. and under agitation to form a salt slurry of not over 35 percent concentration;

c. Measuring the pH of the slurry, and adjusting it to a predetermined value by addition of diamine or diacid;

d. Maintaining the slurry in pumpable condition under agitation or recirculation until required for use.

DESCRIPTION OF THE DRAWINGS

In FIG. 1, (1) represents a stainless steel mixing vessel, which may be of low aspect ratio (height/dia.), as shown, in which is installed a stirrer (2) equipped with paddle-type blades 3,3, driven by motor (4). Mixing vessel (1) has four 45° helical baffles affixed to its interior wall; one of these is shown at (5). Water and salt solution or other reagents are introduced into (1) through line 6, and nitrogen for purging air contamination is introduced via line 7. The slurry is removed for further use, e.g., polymerization, through drain line 8.

A side stream of the slurry is recirculated through line 9, by means of slurry pump 10. The recirculating slurry passes through thermostatically jacketed pH cell 11. Corrective additions of diamine or diacid are made via line 6.

The length of the stirrer blades (3) is 60 percent of the diameter of vessel 1; the blades are rotated so as to attain a tip speed in the range of 400 to 1,000 ft./min., to provide adequate mixing. The vessel may have an external jacket through which water is circulated to maintain the slurry at a specified temperature.

Figure 2:
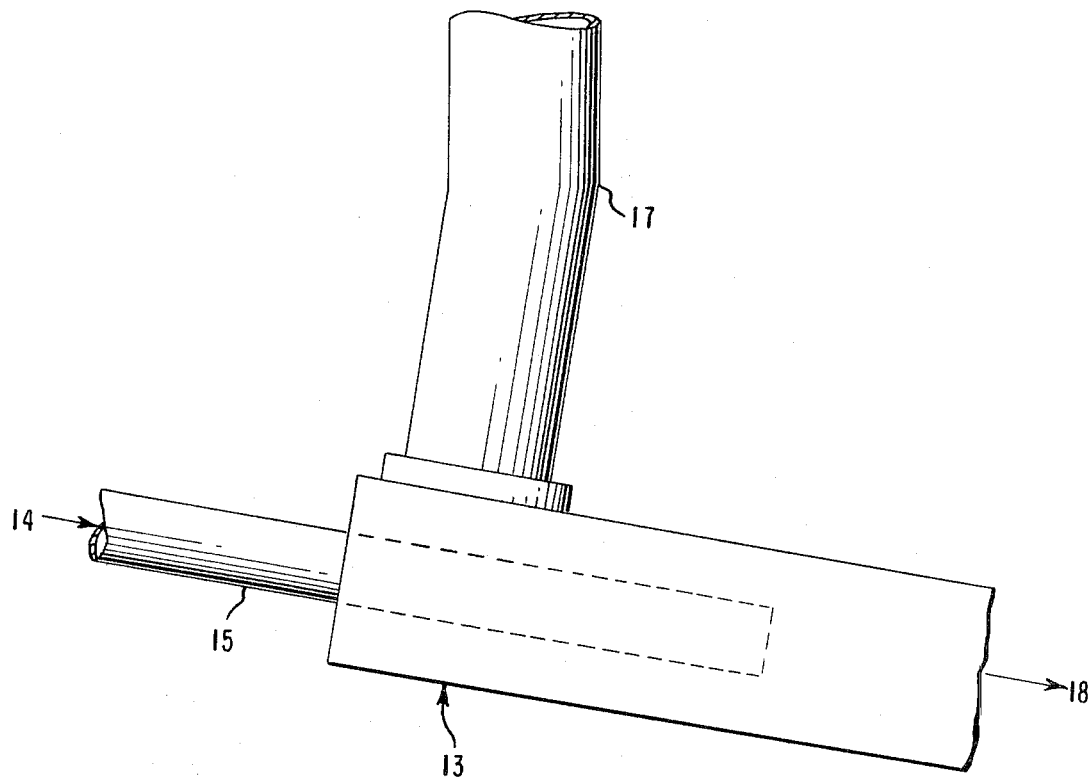
FIG. 2 shows schematically a mixing tee which may be used to continuously produce the pumpable slurry.

The slurry preparation process of the invention may be adapted to continuous operation, for example, by using the mixing tee 13 shown in FIG. 2.

In this embodiment, the salt solution prepared as previously described is injected at 14 through small diameter pipe 15 into an annular stream of cold water in tee 13. The cold water 16 flows into the tee through pipe 17. The quenched slurry leaves the tee at 18, and discharges into a holding tank (not shown) equipped with a stirrer; mixing vessel 1 is suitable. If desired, some of the slurry may be recycled back into the water line 17, although this will not usually be necessary.

It should be noted that the throughput of the hot salt solution in mixing nozzle 13 (FIG. 2) must be sufficiently high so that it does not freeze and plug the tee. If the dilution water temperature is 30°C. or less, the crystal size produced is small such as the acicular type described below, thereby producing a slurry of high viscosity and high stability. The crystals can be made to grow into the platelet form by stirring in vessel 1 for several hours at temperatures of 60° to 70°C., thereby reducing the viscosity but with some loss in slurry stability.

A slurry which is produced by injecting molten PACM diamine into an aqueous suspension of 12 acid in a well-stirred mixing vessel is very stable, but at 30 percent concentration, is difficult to pump being about ten times as viscous as the slurry produced by the batch-type salt solution quench.

In carrying out the slurry preparation process of the invention, it is important to exclude oxygen as completely as possible. This is usually done by flushing vessel 1 with inert gas, e.g., $N_2$. The salt solution must, of course, be made under oxygen-free conditions. The use of deoxygenated water is desirable.

The slurry produced in accord with the invention is higly non-Newtonian, in that its viscosity decreases with increased stirring rate. Nevertheless, when the slurry has been prepared as taught herein, it remains stable over long periods of time at room temperature, even without agitation. Although some settling occurs, a clear supernatant water layer becoming visible after a day or so, the salt crystals remain sufficiently dispersed so that they do not interfere with the use of a pump. If the slurry is held or stored at elevated temperatures, crystal size will increase and viscosity will decrease, and the slurry will become less stable.

Slurry concentration is preferably about 30 percent (by weight), for stable, long-term storage at room temperature. Concentrations up to about 40 percent are pumpable if held at temperatures of about 70°C., although this increases the danger of oxidation and will promote crystal growth leading to subsequent settling.

In preparing the polyamide salt, approximately stoichiometric proportions of the diacid and the diamine will usually be required, but minor changes in this ratio are often required to obtain the desired properties in the polyamide, as mentioned previously. The desired mixture will have a characteristic pH; the proper balance of ingredients can be readily monitored by placing a glass pH electrode at 11 in the recirculating line 9, provided the sensor temperature is carefully controlled. Surprisingly, the pH is quite responsive to addition of diamine and diacid; the response to diamine addition is especially rapid.

It is preferred to adjust the pH to the range of 7.2 to 7.7, which is the range most sensitive to reagent concentration changes, then add a weighed excess of diamine or diacid, if desired. Diamine addition is preferred, since it is a liquid, and the pH response is rapid.

An alternate method of determining equivalence of the reactants is to take an aliquot of the slurry, or to heat portions of the slurry until it is in solution, remove from the reaction vessel, separate and dry the salt, and determine equivalence by the method described by Bly in published U.S. Application Ser. No. 720,073, or that disclosed by Dorsey in U.S. Pat. No. 3,476,713.

It has been mentioned that the slurry is a highly non-Newtonian liquid. For this reason, viscosity must be determined at a standard shear rate, as well as at standard temperature, etc. It has been found convenient to calculate the viscosity by determining the pressure drop when pumping the slurry through a long length of pipe of known diameter at a known shear rate, e.g., 470 sec.$^{-1}$.

It should be noted that slurry viscosity is quite sensitive to pH; lowest viscosity is observed at about neutral pH.

It is apparent that the reacting mixture may contain normal polyamide additives, if desired, such as delusterants, antioxidants, light stabilizers, dye additives, pigments anti-static agents and the like.

EXAMPLE 1

An aqueous solution of 90% PACM–12 salt and 10% PACM-I salt where I indicates isophthalic acid, the PACM being of 70% tt stereoisomer content, is prepared at elevated temperature and pressure as shown in the Flack et al. patent. The solution contains 55 percent salt, and is maintained at a temperature of 130°C. and autogenous pressure.

85 Parts of water at a temperature of 36°C. are added to mixing vessel 1, and the stirrer is operated at a tip speed of 960 ft./min. After air is removed by purging with nitrogen, 100 parts of the salt solution described above are added through line 6, over a period of 16 min. As the hot solution is cooled by mixing with the cold water, salt precipitates as a slurry. The resulting slurry temperature is 68°C., and it contains 30 percent salt. The slurry is cooled to 55°C. in two hours by circulating cold water in the vessel jacket. During this time, the pH is raised from 6.8 to the pH — sensitive range, as indicated at cell 11, by adding 0.95 parts of diamine at (6). The pH is checked by taking a laboratory sample, which is equilibrated to exactly 50°C. before measuring the pH. The laboratory pH is 7.46; a final addition of 0.24 parts of diamine is made to adjust the pH to the preselected value of 8.35.

The salt crystals have a plate-like form, and average about 15 microns long and 5 wide.

The stirrer speed is then reduced to 480 ft./min.; the slurry remains in pumpable condition for 4 days, at a temperature of about 50°C. After storage, the slurry is pumped to a polymerizer. At this time, it has an apparent viscosity of 10 cps at about 55°C., as measured in the pipe line at a shear rate of 470 sec.$^{-1}$.

High quality polymer is made by polymerization of the salt slurry.

EXAMPLE 2

The salt preparation procedure of Example 1 is repeated; the salt concentration is 55 percent, and the solution temperature is 130°C.

Figure 1:
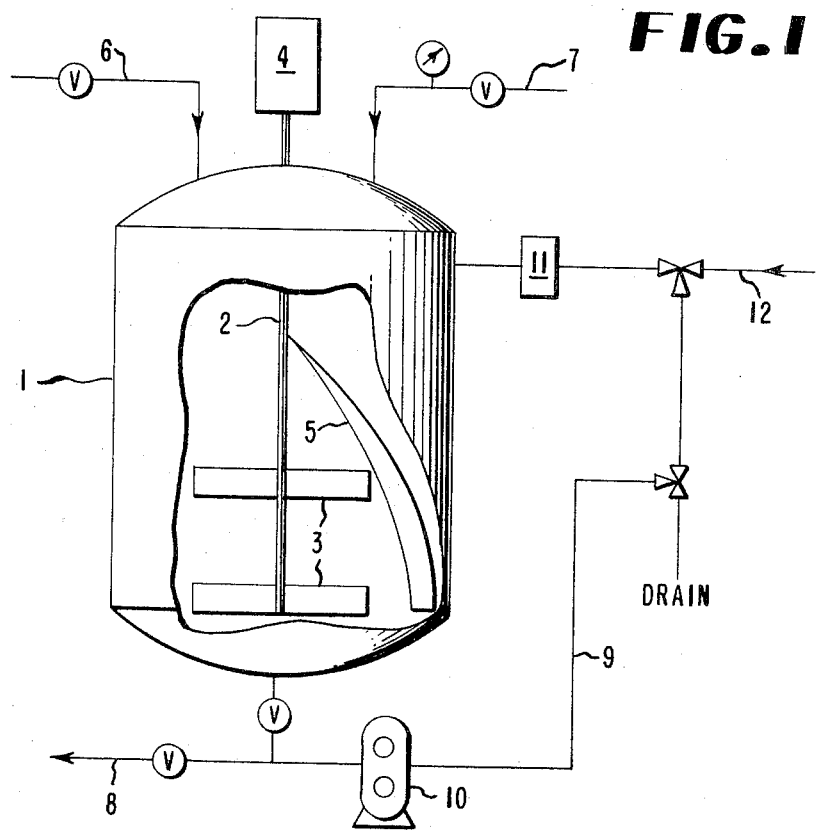
FIG. 1 shows schematically a vessel suitable for producing the pumpable slurry by a batch-type process, in accord with the invention.

100 Parts of this solution are added to 85 parts of water at 30°C. using the mixing tee of FIG. 2, over a period of 45 minutes. The slurry produced is discharged into the mixing vessel 1 of FIG. 1. The stirrer tip speed is 960 ft./min. The pH is about 7.0; 0.7 parts of diamine are added to bring the pH to the sensitive range. A laboratory sample has a pH of 7.94 (50°C.) A final addition of 0.19 parts diamine brings the laboratory pH to 8.47 (50°C.). The slurry is kept under agitation for three days, without settling. The salts crystals are small platelets having an average length of about 5 microns and a width of about 1 micron. The slurry has an apparent viscosity of 100 cps, measured as in Example 1.

The slurry of the invention is especially useful when it is desired to prepare the salt solution in large batches, then hold it for relatively long periods of time for subsequent use, for example, in autoclaves or continuously in a polymerizer.

What is claimed is:

1. A process for producing a stable, pumpable aqueous slurry consisting essentially of about 10–35 percent by weight of a salt which is the reaction product of essentially equivalent amounts of diamine and diacid, the diamine being at least 75 mol percent bis(4-aminocyclohexyl)-methane and the diacid being at least 75 mol percent 1,12-dodecanedioic acid comprising producing a water solution of the salt(s) at a temperature above 100°C. and at autogenous or greater pressure, the salt solution having a concentration of about 50–70 percent, adding the salt solution to sufficient water at about 20–50°C. and under agitation to form a salt slurry of not over 35 percent concentration, measuring the pH of the slurry and adjusting it to a predetermined value by addition of diamine or diacid, and maintaining the slurry in pumpable condition under agitation or recirculation until required for use.

2. The process of claim 1 wherein the salt solution is injected into an annular stream of cold water to form the slurry.

3. The process of claim 1 wherein the salt solution is introduced into a vessel containing the cold water with agitation.

* * * * *